(12) United States Patent
Wu et al.

(10) Patent No.: US 11,200,138 B1
(45) Date of Patent: Dec. 14, 2021

(54) POLICY-BASED REQUEST TRACING USING A COMPUTER

(71) Applicant: International Business Machines Corporation, Armonk, NY (US)

(72) Inventors: Wei Wu, Beijing (CN); Ju Bo Tian, Xi'an (CN); Yue Wang, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/073,536

(22) Filed: Oct. 19, 2020

(51) Int. Cl.
| G06F 9/44 | (2018.01) |
| G06F 11/32 | (2006.01) |
| H04L 29/08 | (2006.01) |
| G06F 11/30 | (2006.01) |
| G06F 11/34 | (2006.01) |

(52) U.S. Cl.
CPC ........ *G06F 11/323* (2013.01); *G06F 11/3006* (2013.01); *G06F 11/3466* (2013.01); *H04L 67/02* (2013.01)

(58) Field of Classification Search
None
See application file for complete search history.

(56) References Cited

U.S. PATENT DOCUMENTS

| 8,874,967 | B2 | 10/2014 | Spafford | |
| 10,581,919 | B2* | 3/2020 | Kruse | H04L 63/20 |
| 2015/0248563 | A1* | 9/2015 | Alfarano | H04L 12/1831 726/27 |
| 2017/0134514 | A1* | 5/2017 | Greifeneder | H04L 67/22 |
| 2018/0150384 | A1 | 5/2018 | Alaranta | |
| 2019/0095311 | A1* | 3/2019 | Milirud | G06F 11/323 |
| 2019/0179728 | A1* | 6/2019 | O'Dowd | G06F 11/3636 |
| 2021/0011789 | A1* | 1/2021 | Gilling | G06F 9/547 |

OTHER PUBLICATIONS

"Sampling", honeycomb.io, Last printed Oct. 13, 2020, 7 pages, <https://docs.honeycomb.io/working-with-your-data/best-practices/sampling/>.
Flanders, Steve, "Intelligent Sampling with OpenCensus", Cloud Native, Apr. 17, 2019, 3 pages, <https://sflanders.net/2019/04/17/intelligent-sampling-with-opencensus/>.
Las-Casas, et al., "Weighted Sampling of Execution Traces: Capturing More Needles and Less Hay", SoCC '18, 7 pages, <https://people.mpi-sws.org/~jcmace/papers/lascasas2018weighted.pdf>.
Mell et al., "The NIST Definition of Cloud Computing", National Institute of Standards and Technology, Special Publication 800-145, Sep. 2011, 7 pages.

\* cited by examiner

*Primary Examiner* — Qamrun Nahar
(74) *Attorney, Agent, or Firm* — Michael A. Petrocelli

(57) ABSTRACT

Embodiments of the present disclosure relate to policy-based request tracing in a distributed environment. In an embodiment, a computer-implemented method is disclosed. According to the method, a first set of requests and a second set of requests are determined in a plurality of received requests based on a policy. A first subset of requests is selected from the first set of requests based on a first sampling rate, and a second subset of requests is selected from the second set of requests based on a second sampling rate that is less than the first sampling rate. Executions of the first subset of requests and the second subset of requests on components of a distributed system are then traced. In other embodiments, a system and a computer program product are disclosed.

20 Claims, 6 Drawing Sheets

POLICY-BASED REQUEST TRACING USING A COMPUTER

BACKGROUND

The present invention relates to computer techniques, and more specifically, to a method, system, and computer program product for policy-based request tracing using a computer.

In a distributed environment, there are a lot of large and complex devices. Management and development tasks are difficult in the distributed environment because traditional machine-centric monitoring and tracing mechanisms are not effective. Traditional machine-centric monitoring and tracing mechanisms cannot provide a coherent view of the work done by different components of a distributed system in a distributed environment.

To accommodate the distributed environment, a distributed tracing has been developed. The distributed tracing, also known as end-to-end tracing, is a technique that aims to capture the detailed executions of causally-related activities, which are performed by components of the distributed system. The distributed tracing has been shown to be efficient and has proven useful for a lot of distributed use cases.

SUMMARY

According to one embodiment of the present invention, there is provided a computer-implemented method. According to the method, a first set of requests and a second set of requests are determined in a plurality of received requests based on a policy. A first subset of requests is selected from the first set of requests based on a first sampling rate, and a second subset of requests is selected from the second set of requests based on a second sampling rate which is less than the first sampling rate. Executions of the first subset of requests and the second subset of requests on components of a distributed system are then traced.

According to another embodiment of the present invention, there is provided a system. The system comprises a processing unit and a memory coupled to the processing unit and storing instructions thereon. The instructions, when executed by the processing unit, perform acts comprising determining a first set of requests and a second set of requests in a plurality of received requests based on a policy. The acts further comprise selecting a first subset of requests from the first set of requests based on a first sampling rate and selecting a second subset of requests from the second set of requests based on a second sampling rate which is less than the first sampling rate. The acts further comprise tracing executions of the first subset of requests and the second subset of requests on components of a distributed system.

According to a further embodiment of the present invention, there is provided a computer program product. The computer program product comprises a computer readable storage medium having program instructions embodied therewith, the program instructions executable by an electronic device to cause the electronic device to perform acts of the methods according to embodiments of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
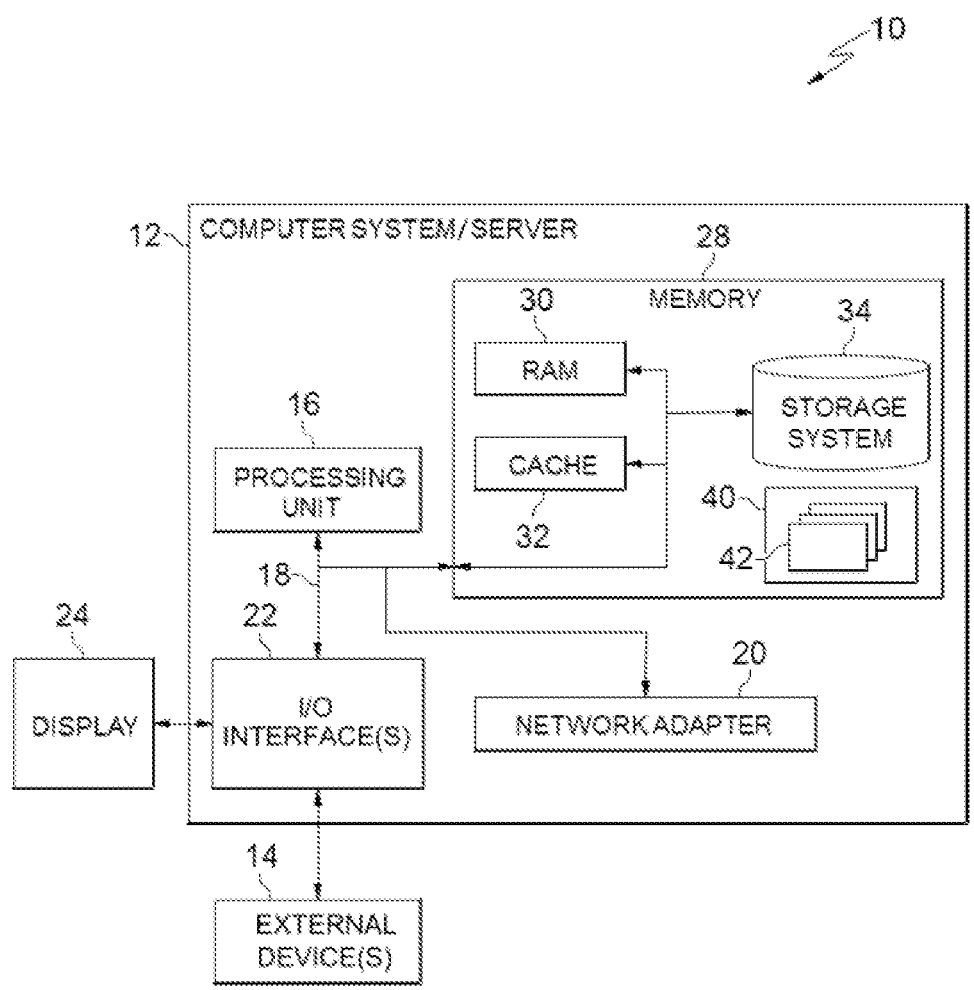
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of distributed environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node 10 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
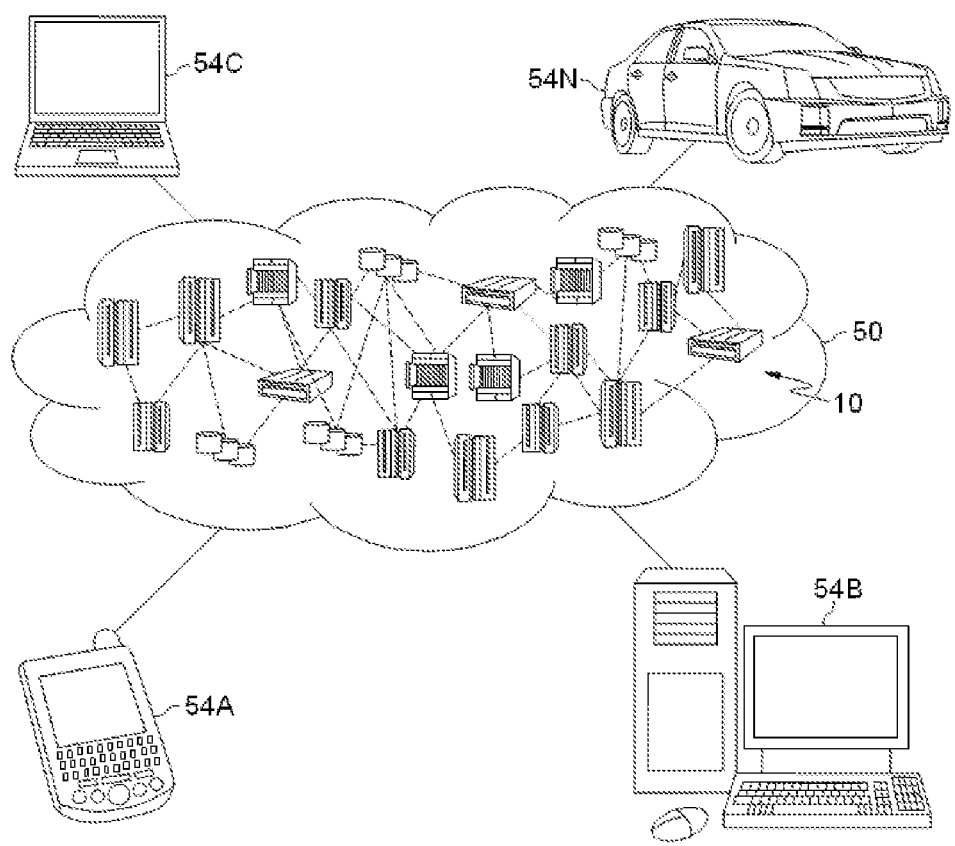
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
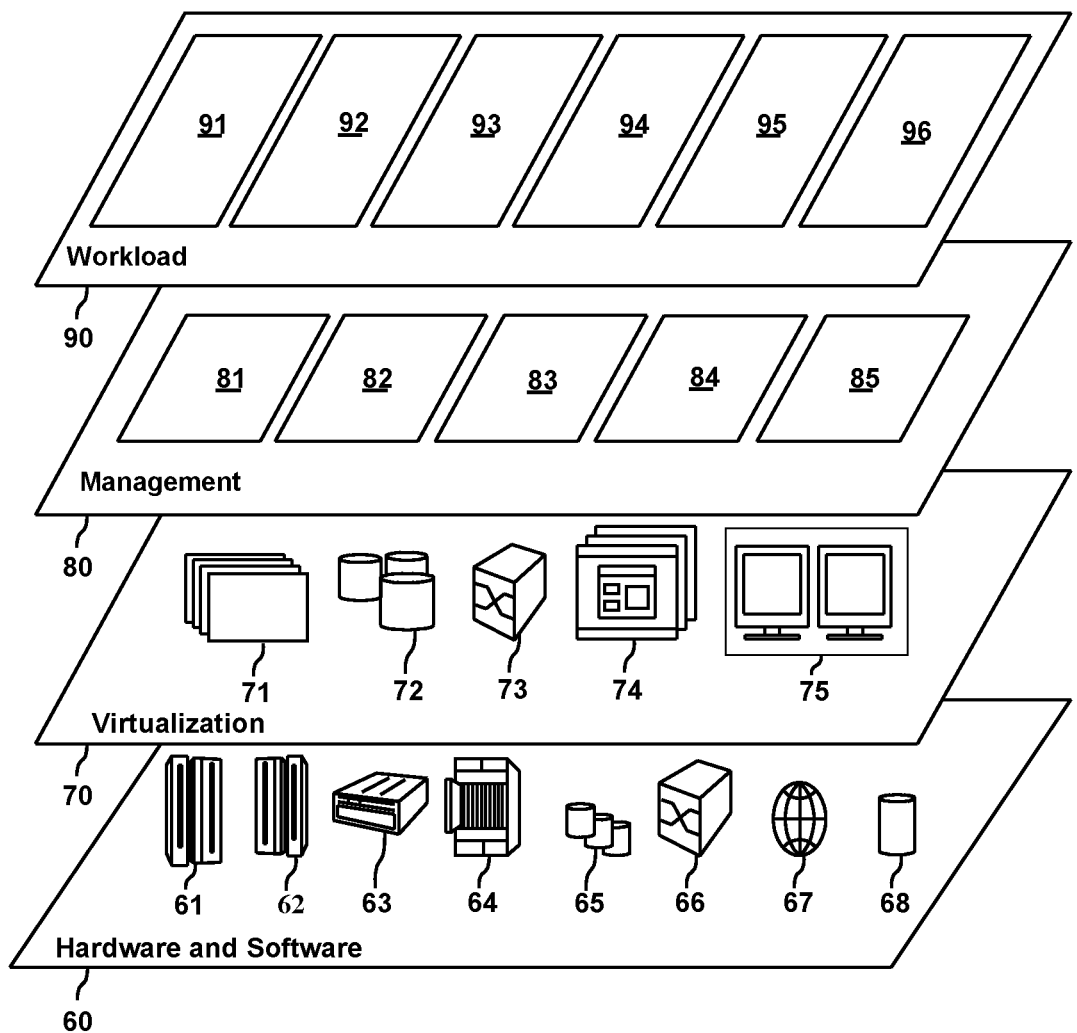
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and policy-based request tracing 96. The functionalities of policy-based request tracing will be described in the following embodiments of the present disclosure.

As discussed above, the distributed tracing is now used to trace the requests in the distributed system, and has been proven useful for some use cases. Traditionally, there are mainly two ways for sampling requests in the distributed tracing. The first way is a head-based method, in which a random sampling decision is made at the beginning of a workflow, and the sampled request will be traced through completion. However, since the head-based method samples requests randomly at the beginning and discards other requests, it may miss some valuable traces (such as failed traces). The second way is a tail-based method, in which the sampling decision is made at the end of a workflow, and all the requests will be traced. The tail-based method is useful for collecting the failed traces, and it can improve the sampling accuracy as compared with the head-based method. However, since the tail-based method traces all the requests, it needs a large amount of storage resources to cache or store the tracing data. Thus, the traditional head-based method is not accurate, and the traditional tail-based method consumes a large amount of storage resources.

According to example embodiments of the present invention, there is provided a solution for policy-based request tracing in a distributed environment. According to the present solution, a first set of requests and a second set of requests are determined in a plurality of received requests based on a policy. A first subset of requests is selected from the first set of requests based on a first sampling rate (also called as tracing rate), and a second subset of requests is selected from the second set of requests based on a second sampling rate that is less than the first sampling rate. Executions of the first subset of requests and the second subset of requests on components of a distributed system are then traced.

According to an embodiment of the present invention, a relative high sampling rate is used to sample requests matching the policy, while a relative low sampling rate is used to sample requests not matching the policy. Then, the sampled requests are traced during the executions of the requests on components of the distributed system. Thus, the subject matter of the present invention can enhance tracing accuracy of the system used in the distributed environment such as cloud environment. As compared with the traditional head-based method, the subject matter of the present invention can improve error tracing accuracy by leveraging the tail-based tracing capability while reducing the usage of storage resources.

According to some embodiments of the present invention, there is disclosed an architecture of an example system for tracing which may comprise a policy-based sampling module, a policy server, and a tracing server, and the policy-based sampling module may manage the policy for sampling and select the requests to be traced.

Some example embodiments of the present invention will be described in detail with reference to FIGS. 4-8.

Figure 4:
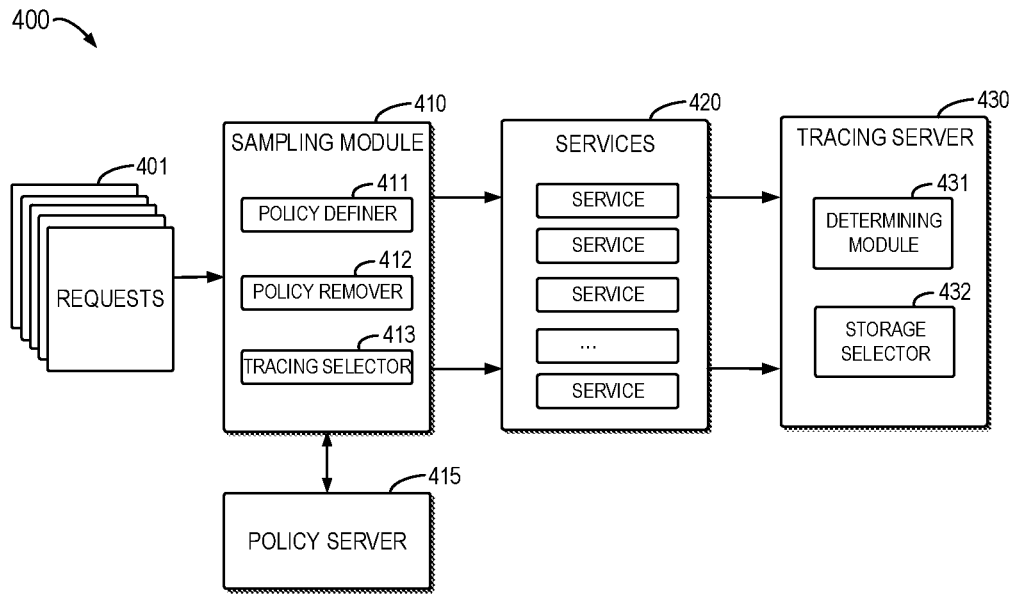
FIG. 4 depicts a block diagram of a system for policy-based request tracing according to an embodiment of the present disclosure.

Reference is now made to FIG. 4, which illustrates a block diagram of a system 400 for policy-based request tracing according to an embodiment of the present disclosure. Tracing is the common developer practice of profiling and analyzing application code to identify the source of a particular error, find ways to improve performance, or simply understand application data flow. The system 400 may be used to capture the workflow of causally-related events (such as work done to process a request) within and among the components of a distributed system, and tracing is a critical tool for understanding the distributed system behaviors. As shown in FIG. 4, the system 400 includes a policy-based sampling module 410, a policy server 415, services 420, and a tracing server 430. The system 400 may be implemented by computer system/server 12 of FIG. 1, and the policy-based sampling module 410, a policy server 415, services 420 and a tracing server 430 in the system 400 may be implemented in software, hardware, middleware, and/or any combination thereof.

The policy-based sampling module 410 is a preprocessing module and may be regarded as an ingress gateway. Because the system 410 may have a large number of requests, the system 410 generally does not trace all requests. As a result, sampling the requests is a required process. Unlike the traditional head-based method, the policy-based sampling module 410 of an embodiment of the present disclosure utilizes a different sampling strategy, which sets different sampling rates for different types of requests. The policy-based sampling module 410 may define one or more filter conditions in the policy, set different sampling rates for requests matching the policy and requests not matching the policy, and sample the requested with different sampling rates. The policy server 415 may be configured to store the policy. The services 420 may be used to execute the requests and record the tracing data of the sampled requests. The tracing server 430 may be configured to receive the tracing data of sampled requests from the services 420.

As shown in FIG. 4, the policy-based sampling module 410 may include a policy definer 411, a policy remover 412, and a tracing selector 413. As used herein, the policy, in which one or more filter conditions may be defined, is used for filtering or differentiating the received plurality of requests. For example, if a request satisfies a condition(s) defined in the policy, it indicates that this request matches the policy. Instead, if a request does not satisfy any condition defined in the policy, it indicates that this request does not match the policy. An example condition in the policy may be "ULR in the request is 'URL_1'", and another example condition in the policy may be "a function name in the request includes 'post'". According to the policy, the received plurality of requests may be divided into two types, a first type in which requests match the policy, and a second type in which requests do not match the policy. In some embodiments, the received plurality of requests may be divided into more than two types.

The policy definer 411 is configured to define the condition(s) in the policy for filtering requests. Generally, in the distributed environment, each request may include, but not limited to, one or more Uniform Resource Locators (URLs), one or more function names, one or more parameter types, parameter values and so on. Initially, the condition(s) in the policy may be defined by a system administrator manually. For example, the administrator finds that the executions of requests on a certain URL often fail, and the administrator may define a condition in the policy based on this URL, which means the request including this URL will be regarded as matching the policy. Alternatively, or in addition, the function name, the parameter type or field also may be used for defining the conditions in the policy.

The policy definer 411 may be configured to define a new condition in the policy automatically. For example, according to the execution results of the requests which include tracing tags, the policy definer 411 may define a new condition automatically based on the analysis of the failed requests without human intervention. In this way, the policy may be updated dynamically, thereby improving the accuracy for request filtering.

The policy remover 412 may be configured to remove the condition(s) from the policy. For example, if the administrator has solved the problem associated with a condition in the policy, the policy remover 412 can remove the related condition from the policy. Alternatively, or in addition, the policy remover 412 may remove the conditions according to the execution results of the requests. For example, if a request matching the policy can execute successfully on the services in the cloud, it means that the problem associated with the condition may have been solved. As a result, this condition does not need to be retained and may be removed. In this way, the policy may be updated dynamically, thereby further improving the accuracy for request filtering.

As shown in FIG. 4, the policy may be stored in a policy server 415, which is centralized policy server for storing and managing the policy. Fox example, the policy definer 411 may send a request to the policy server 415 to define a new condition in the policy, and the policy remover 412 may send a request to the policy server 415 to remove an existing condition in the policy. If the policy-based sampling module 410 wants to check whether a request matches the policy, the policy-based sampling module 410 may query the policy data maintained in the policy server 415. Alternatively, the policy server 415 may be also integrated into the policy-based sampling module 410.

The tracing selector 413 may be configured to select requests to be traced based on different sampling rates. For example, the tracing selector 413 will sample requests at a relative high sampling rate for the requests matching the policy, and the tracing selector 413 will sample requests at a relative low sampling rate for the requests not matching the policy. Alternatively, the policy may define condition(s) associated with the successful requests. In this case, the tracing selector 413 may sample requests at a relative low sampling rate for the requests matching the policy, and the tracing selector 413 may sample requests at a relative high sampling rate for the requests not matching the policy. After sampling the requests to be traced, the corresponding notifications may be sent to the related services 420 in the cloud.

In some embodiments, the policy-based sampling module 410 may also include a sampling rate setting module (not shown). The values of a higher sampling rate and a lower sampling rate may be set in the sampling rate setting module. Alternatively, the values of higher sampling rate and lower sampling rate may be adjusted dynamically according to actual situations. For example, if the number of the received request is very large, the values of higher sampling rate and lower sampling rate may be decreased accordingly.

Figure 5:
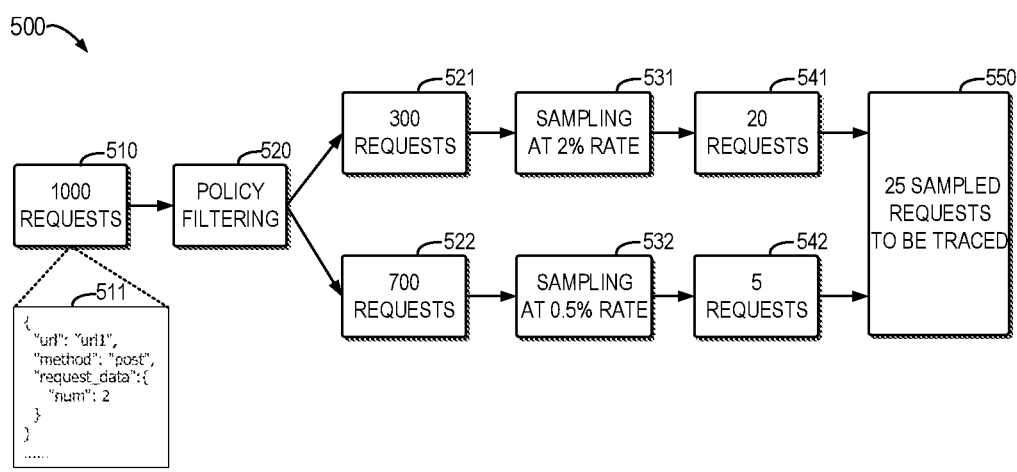
FIG. 5 depicts an example process for selecting requests to be traced according to an embodiment of the present disclosure.

Referring to FIG. 5, which depicts an example process 500 for selecting requests to be traced according to an embodiment of the present disclosure, and the process 500 may be performed at least by the policy-based sampling module 410 as shown in FIG. 4. It is understood that the specific numbers in FIG. 5 are only shown as an example, without limiting embodiments of the present disclosure.

At 510, the policy-based sampling module 410 receives a plurality of requests (such as 1000 requests) during a period of time. An example of a request 511 may include a URL, a method, and parameters, as shown in FIG. 5. At 520, the policy-based sampling module 410 filters the plurality of requests based on the policy. After policy filtering at 520, the plurality of requests are divided into a first set of requests matching the policy (such as 300 requests at 521) and a second set of requests not matching the policy (such as 700 requests at 522). Generally speaking, only a lower proportion of the requests among the whole requests may be error prone and may match the policy. In some embodiments, if a given request satisfies a condition(s) defined in the policy, it means that the given request matches the policy. Instead, if a given request does not satisfy any condition defined in the policy, it means that the given request does not match the policy.

At 531, for the first set of requests matching the policy (such as the 300 requests), a first sampling rate (such as 2%) is used to randomly select a first subset of requests (such as 20 requests at 541) from the first set of requests. Accordingly, the sampled first subset of requests (such as 20 requests) which match the policy will be traced during the executions. In an embodiment, if the number (such as 10) of the first set of requests matching the policy is less than the first sampling number (such as 20) calculated according to the first sampling rate, all of the first set of requests will be sampled. In this example, the 10 requests matching the policy are selected as the first subset of requests.

At 532, for the second set of requests not matching the policy (such as the 700 requests), a lower second sampling rate (such as 0.5%) is used to randomly select a second subset of requests (such as 5 requests at 542) from the second set of requests. Accordingly, the sampled second subset of requests (such as 5 requests) which do not match the policy will be traced during the executions.

At 550, the 25 sampled requests are determined and will be traced during executions on components of a distributed system. According to the process 500 of FIG. 5, a relative high sampling rate is used to sample requests matching the policy, and a relative low sampling rate is used to sample these requests not matching the policy. Since requests matching the policy are relatively error prone, a relative high proportion of requests will be traced during the executions in the distributed system. Accordingly, the subject matter of the present disclosure can enhance tracing accuracy of the system in the distributed environment.

In some embodiments, in the example of FIG. 5, the first and second sampling rates are relative to the received 1000 requests, and thus the numbers of first and second subsets are calculated based on the value 1000. Alternatively, the first sampling rate may be relative to the first set of requests matching the policy, while the second sampling rate may be relative to the second set of requests not matching the policy.

Referring back to FIG. 4, the services 420 execute the requests cooperatively and record the tracing data. The tracing data for the sampled requests is recorded during the executions and sent to the tracing server 430. The tracing data of the unsampled requests may not be recorded during the executions. Alternatively, the tracing data of unsampled requests may be cached temporarily in the service, but the cached tracing data will be discarded without sending to the tracing server 430.

In some embodiments, the services 420 may include a plurality of cloud services, such as microservices in a microservices architecture. The microservices architecture is a cloud native architecture in which a single application is composed of many loosely coupled and independently deployable small components or services. These services typically: have their own stack, including the database and data model; communicate with one another over a combination of REST APIs, event streaming, and message brokers; and are organized by business capability.

Figure 6:
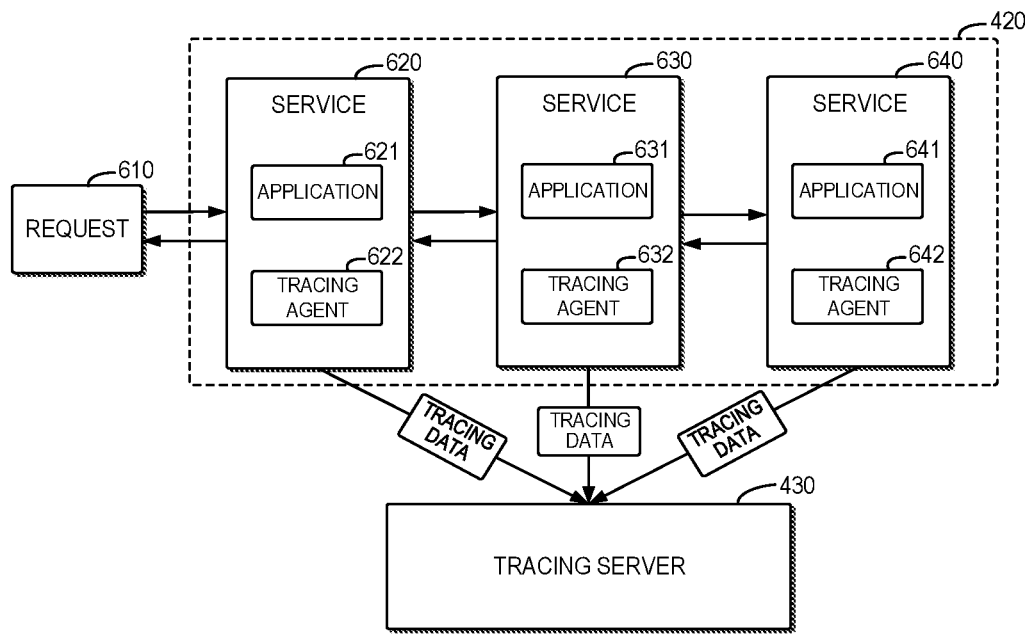
FIG. 6 depicts an example for executing and tracing a request according to an embodiment of the present disclosure.

Referring to FIG. 6, which depicts an example for executing and tracing a request according to an embodiment of the present disclosure. In this example, a request 610 is related to three services 620, 630 and 640, and thus the request 610 will be sent to services 620, 630 and 640 for execution according the dependencies defined in the request. The request 610 may be a request matching the policy or a request not matching the policy. Each service at least includes an application and a tracing agent. For example, the service 620 includes an application 621 and a tracing agent 622, the service 630 includes an application 631 and a tracing agent 632, and the service 640 includes an application 641 and a tracing agent 642.

As shown in FIG. 6, the application 641 processes the request 610, and generates related tracing data, such as the execution method, logs and execution time. After completion of the execution of the request 610 on the service 640, the tracing agent 642 will send the tracing data to the tracing server 430. Similarly, the tracing agent 632 will send its tracing data to the tracing server 430 after completion of the execution of the request 610 on the service 630, and the tracing agent 622 will send its tracing data to the tracing server 430 after completion of the execution of the request 610 on the service 620. The tracing server 430 will integrate the tracing data for the request 610 from different services 620, 630 and 640. After the execution of the request 610 is completed, a status code of the request 610 will also be sent to the tracing server 430. The tracing server 430 can determine whether the request 610 is successful based on the status code. For example, the status code "200" indicates that the request 610 is successful, while the status code "404" indicates that the request 610 is unsuccessful.

Referring back to FIG. 4, the tracing server 430 is configured to receive the tracing data of the sampled requests, and decide which tracing data needs to be stored for later analysis, such as optimization or debug. The tracing server 430 includes a determining module 431 and a storage selector 432. The determining module 431 is configured to determine whether each request is successful according to a status code or a tag. For example, if the status code includes one of "404" and "504", the tag will be "error." Instead, if the status code includes one of "200" and "202", the tag will be "success." Depending on the tags, the determining module 431 can determine which requests are successful and which requests are unsuccessful.

In some embodiments, the determining module 431 may be configured to provide feedback to the policy-based sampling module 410 so as to dynamically define or remove the condition(s) in the policy. For example, if an execution result of a request matching the policy indicates a success, the corresponding condition may be removed from the policy. For another example, if an execution result of a request not matching the policy indicates an error, a new condition associated with this request needs to be defined in the policy accordingly. In this way, the conditions in the policy may be updated dynamically, thereby improving the accuracy for request filtering.

The storage selector 432 is configured to select the tracing data for storing in the storage device. In some embodiments, tracing data of only a predetermined number of requests may be retained, while other tracing data will be discarded. For example, the storage selector 432 may select some requests from the failed requests. Thus, embodiments of the present disclosure can store more failed requests than traditional methods, and improve the accuracy of the tracing.

Figure 7:
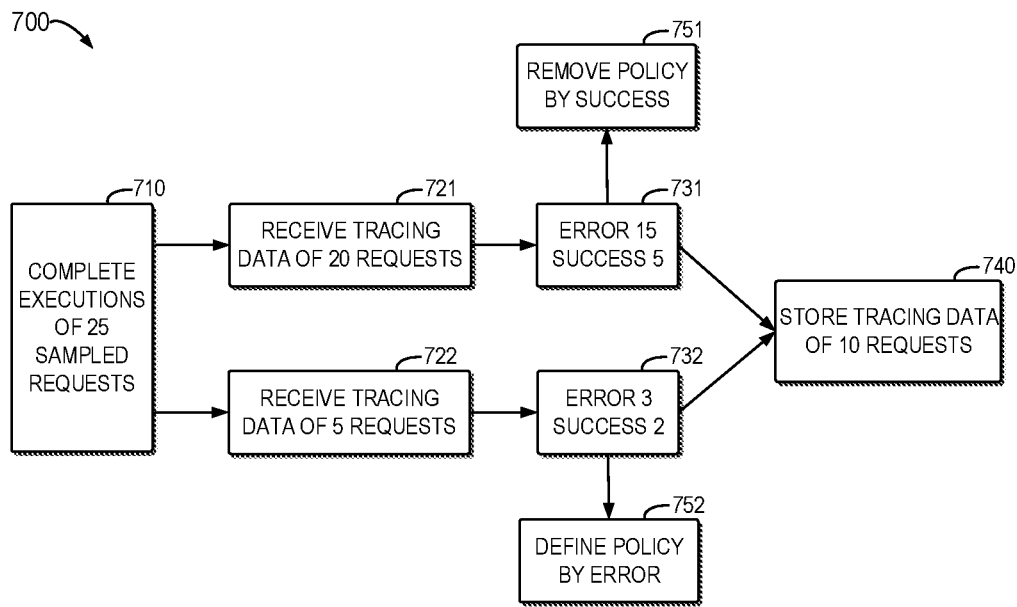
FIG. 7 depicts an example process for storing the tracing data of some sampled requests and updating the policy according to an embodiment of the present disclosure.

Referring to FIG. 7, which depicts an example process 700 for storing the tracing data of some sampled requests and updating the policy according to an embodiment of the present disclosure, and the process 700 may be performed at least by the tracing server 430 as shown in FIG. 4. It is understood that the numbers in FIG. 7 is only shown for example, without limiting the embodiments of the present disclosure.

FIG. 7 illustrates the same example as FIG. 5, in which 25 sampled requests are selected for tracing during the executions on the services in the cloud. At 710, the executions of the 25 sampled requests are completed. The determining module 431 receives tracing data of the 20 requests matching the policy at 721, and it determines that 15 requests fail while 5 requests succeed at 731. Similarly, the determining module 431 receives tracing data of the 5 requests not matching the policy at 722, and it determines that 3 requests fail while 2 requests succeed at 732.

At 740, the storage selector 432 selects 10 requests from the 25 requests and stores tracing data of the selected 10 requests. For example, the tracing server 430 may determine the number of 10 based on a predetermined sampling rate (such as 1%) and the total number 1000 of the requests, and randomly select 10 requests from the 15 failed requests matching the policy as determined at 731 and the 3 failed requests not matching the policy as determined at 732. In this way, the finally selected requests have more failure information than traditional ways with the same sampling rate (such as 1%). Thus, the subject matter of the present disclosure can improve the tracing accuracy in the distributed system.

In some embodiments, at 751, the determining module 431 identifies the successful requests (such as the 5 requests) matching the policy, and sends an indication to the policy-based sampling module 410 for removing the corresponding conditions from the policy. For example, the problems associated with the conditions may have been solved, and the conditions need to be removed accordingly. In some embodiments, at 752, the determining module 431 identifies the failed requests (such as the 3 requests) not matching the policy, and sends an indication to the policy-based sampling module 410 for defining new conditions in the policy. In this way, the conditions in the policy may be updated automatically and dynamically, which can ensure the accuracy of the policy.

Figure 8:
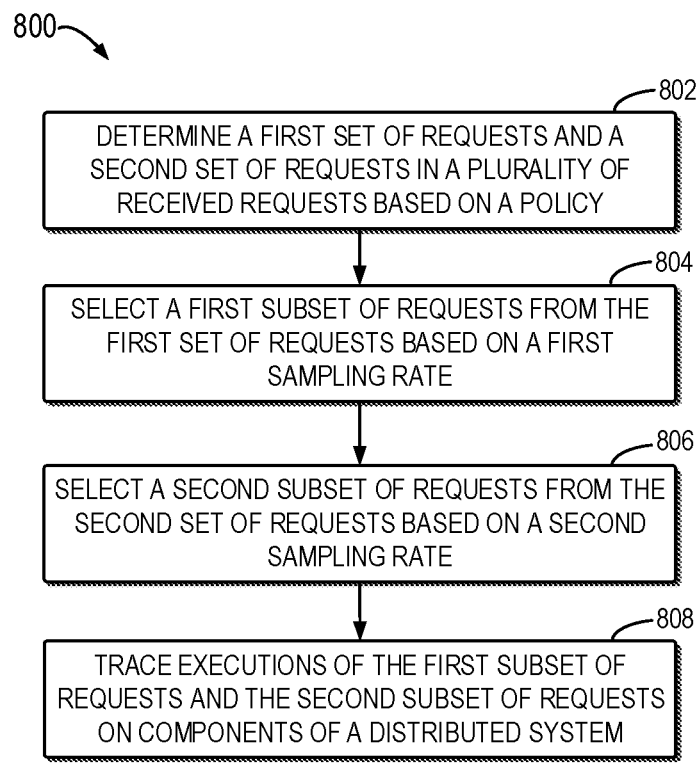
FIG. 8 depicts a flowchart of an example computer-implemented method according to an embodiment of the present disclosure.

FIG. 8 depicts a flowchart of an example computer-implemented method 800 according to an embodiment of the present disclosure. The method 800 may be implemented at the system 400. For the purpose of discussion, the method 800 will be described with reference to FIG. 4.

At block 802, the system 400 determines a first set of requests and a second set of requests in a plurality of received requests based on a policy. At block 804, the system 400 selects a first subset of requests from the first set of requests based on a first sampling rate. At block 806, the system 400 selects a second subset of requests from the second set of requests based on a second sampling rate, and the second sampling rate is less than the first sampling rate. At block 808, the system 400 traces executions of the first subset of requests and the second subset of requests on components of a distributed system.

In some embodiments, determining a first set of requests and a second set of requests in a plurality of requests based on a policy (802) comprises the following steps for a given request in the plurality of received requests: determining whether the given request satisfies a condition defined in the policy; in accordance with a determination that the given request satisfies the condition defined in the policy, determining that the given request belongs to the first set of requests; and in accordance with a determination that the given request does not satisfy any condition defined in the policy, determining that the given request belongs to the second set of requests.

In some embodiments, tracing executions of the first subset of requests and the second subset of requests on components of a distributed system (808) comprises: selecting a number of requests from the first subset of requests and the second subset of requests based on a predetermined sampling rate; and storing execution records of the number of requests obtained from the components of the distributed system.

In some embodiments, selecting a number of requests from the first subset of requests and the second subset of requests based on a predetermined sampling rate comprises: identifying one or more failed requests in the first subset of requests and the second subset of requests after the executions of the first subset of requests and the second subset of requests are completed; and obtaining the number of requests based on the one or more failed requests.

In some embodiments, the method 800 further comprises: identifying at least one successful request in the first subset of requests after the executions of the first subset of requests are completed; and removing at least one condition from the policy based on the at least one successful request.

In some embodiments, the method 800 further comprises: identifying at least one failed request in the second subset of requests after the executions of the second subset of requests are completed; and defining at least one condition in the policy based on the at least one failed request.

In some embodiments, wherein defining at least one condition in the policy comprises: defining the at least one condition based on at least one of a Uniform Resource Locator (URL), a function name and a parameter type associated with the at least one failed request.

In some embodiments, wherein selecting a first subset of requests from the first set of requests comprises: determining the number of the first subset of requests based on the number of the plurality of received requests and the first sampling rate; and selecting the first subset of requests from the first set of requests randomly according to the determined number of the first subset of requests.

In some embodiments, the method 800 further comprises: executing, by a plurality of services in a cloud, a request in the first subset of requests or the second subset of requests; and sending, by the plurality of services, tracing data associated with the request to a tracing server.

It should be noted that the processing of policy-based request tracing (or achieved by the system for policy-based request tracing) according to embodiments of this disclosure may be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by one or more processors, a first set of requests and a second set of requests in a plurality of received requests based on a policy;
   selecting, by one or more processors, a first subset of requests from the first set of requests based on a first sampling rate;
   selecting, by one or more processors, a second subset of requests from the second set of requests based on a second sampling rate, the second sampling rate being less than the first sampling rate; and
   tracing, by one or more processors, executions of the first subset of requests and the second subset of requests on components of a distributed system.

2. The method of claim 1, wherein determining a first set of requests and a second set of requests in a plurality of requests based on a policy comprises:
   for a given request in the plurality of received requests:
      determining, by one or more processors, whether the given request satisfies a condition defined in the policy;
      in accordance with a determination that the given request satisfies the condition defined in the policy, determining, by one or more processors, that the given request belongs to the first set of requests; and
      in accordance with a determination that the given request does not satisfy any condition defined in the policy, determining, by one or more processors, that the given request belongs to the second set of requests.

3. The method of claim 1, wherein tracing executions of the first subset of requests and the second subset of requests on components of a distributed system comprises:
   selecting, by one or more processors, a number of requests from the first subset of requests and the second subset of requests based on a predetermined sampling rate; and
   storing, by one or more processors, execution records of the number of requests obtained from the components of the distributed system.

4. The method of claim 3, wherein selecting a number of requests from the first subset of requests and the second subset of requests based on a predetermined sampling rate comprises:
   identifying, by one or more processors, one or more failed requests in the first subset of requests and the second subset of requests after the executions of the first subset of requests and the second subset of requests are completed; and
   obtaining, by one or more processors, the number of requests based on the one or more failed requests.

5. The method of claim 2, further comprising:
   identifying, by one or more processors, at least one successful request in the first subset of requests after the executions of the first subset of requests are completed; and
   removing, by one or more processors, at least one condition from the policy based on the at least one successful request.

6. The method of claim 2, further comprising:
   identifying, by one or more processors, at least one failed request in the second subset of requests after the executions of the second subset of requests are completed; and
   defining, by one or more processors, at least one condition in the policy based on the at least one failed request.

7. The method of claim 6, wherein defining at least one condition in the policy comprises:
   defining, by one or more processors, the at least one condition based on at least one of a Uniform Resource Locator (URL), a function name and a parameter type associated with the at least one failed request.

8. The method of claim 1, wherein selecting a first subset of requests from the first set of requests comprises:
   determining the number of the first subset of requests based on the number of the plurality of received requests and the first sampling rate; and
   selecting, by one or more processors, the first subset of requests from the first set of requests randomly according to the determined number of the first subset of requests.

9. The method of claim 1, further comprising:
   executing, by a plurality of services in a cloud, a request in the first subset of requests or the second subset of requests; and
   sending, by the plurality of services, tracing data associated with the request to a tracing server.

10. A system comprising:
    a processing unit; and
    a memory coupled to the processing unit and storing instructions thereon, the instructions, when executed by the processing unit, performing acts comprising:
       determining a first set of requests and a second set of requests in a plurality of received requests based on a policy;
       selecting a first subset of requests from the first set of requests based on a first sampling rate;
       selecting a second subset of requests from the second set of requests based on a second sampling rate, the second sampling rate being less than the first sampling rate; and
       tracing executions of the first subset of requests and the second subset of requests on components of a distributed system.

11. The system of claim 10, wherein determining a first set of requests and a second set of requests in a plurality of requests based on a policy comprises:

for a given request in the plurality of received requests:
- determining whether the given request satisfies a condition defined in the policy;
- in accordance with a determination that the given request satisfies the condition defined in the policy, determining that the given request belongs to the first set of requests; and
- in accordance with a determination that the given request does not satisfy any condition defined in the policy, determining that the given request belongs to the second set of requests.

12. The system of claim 10, wherein tracing executions of the first subset of requests and the second subset of requests on components of a distributed system comprises:
- selecting a number of requests from the first subset of requests and the second subset of requests based on a predetermined sampling rate; and
- storing execution records of the number of requests obtained from the components of the distributed system.

13. The system of claim 12, wherein selecting a number of requests from the first subset of requests and the second subset of requests based on a predetermined sampling rate comprises:
- identifying one or more failed requests in the first subset of requests and the second subset of requests after the executions of the first subset of requests and the second subset of requests are completed; and
- obtaining the number of requests based on the one or more failed requests.

14. The system of claim 11, the acts further comprising:
- identifying at least one successful request in the first subset of requests after the executions of the first subset of requests are completed; and
- removing at least one condition from the policy based on the at least one successful request.

15. The system of claim 11, the acts further comprising:
- identifying at least one failed request in the second subset of requests after the executions of the second subset of requests are completed; and
- defining at least one condition in the policy based on the at least one failed request.

16. The system of claim 15, wherein defining at least one condition in the policy comprises:
- defining the at least one condition based on at least one of a Uniform Resource Locator (URL), a function name and a parameter type associated with the at least one failed request.

17. The system of claim 10, wherein selecting a first subset of requests from the first set of requests comprises:
- determining the number of the first subset of requests based on the number of the plurality of received requests and the first sampling rate; and
- selecting the first subset of requests from the first set of requests randomly according to the determined number of the first subset of requests.

18. The system of claim 10, the acts further comprising:
- executing a request in the first subset of requests or the second subset of requests using a plurality of services in a cloud; and
- sending tracing data associated with the request to a tracing server by the plurality of services.

19. A computer program product, the computer program product comprising a computer readable storage medium having program instructions embodied therewith, the program instructions executable by an electronic device to cause the electronic device to perform acts comprising:
- determining a first set of requests and a second set of requests in a plurality of received requests based on a policy;
- selecting a first subset of requests from the first set of requests based on a first sampling rate;
- selecting a second subset of requests from the second set of requests based on a second sampling rate, the second sampling rate being less than the first sampling rate; and
- tracing executions of the first subset of requests and the second subset of requests on components of a distributed system.

20. The computer program product of claim 19, wherein determining a first set of requests and a second set of requests in a plurality of requests based on a policy comprises:

for a given request in the plurality of received requests:
- determining whether the given request satisfies a condition defined in the policy;
- in accordance with a determination that the given request satisfies the condition defined in the policy, determining that the given request belongs to the first set of requests; and
- in accordance with a determination that the given request does not satisfy any condition defined in the policy, determining that the given request belongs to the second set of requests.

* * * * *